US012128780B1

(12) United States Patent
Booth et al.

(10) Patent No.: US 12,128,780 B1
(45) Date of Patent: Oct. 29, 2024

(54) MULTI-COIL INDUCTIVE CHARGING FOR VEHICLES

(71) Applicant: Zoox, Inc., Foster City, CA (US)

(72) Inventors: Bryan Booth, San Francisco, CA (US); Vamsi Krishna Pathipati, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 572 days.

(21) Appl. No.: 17/364,213

(22) Filed: Jun. 30, 2021

(51) Int. Cl.
*B60L 53/38* (2019.01)
*B60L 53/12* (2019.01)
*H02J 50/10* (2016.01)
*H02J 50/40* (2016.01)
*H02J 50/90* (2016.01)
*B60L 53/35* (2019.01)
*B60L 53/36* (2019.01)

(52) U.S. Cl.
CPC .............. *B60L 53/38* (2019.02); *B60L 53/12* (2019.02); *H02J 50/10* (2016.02); *H02J 50/402* (2020.01); *H02J 50/90* (2016.02); *B60L 53/35* (2019.02); *B60L 53/36* (2019.02); *H02J 2310/48* (2020.01)

(58) Field of Classification Search
CPC .. H02J 50/10; H02J 50/80; H02J 50/90; H02J 50/402; H02J 2310/48; B60L 53/12; B60L 53/35; B60L 53/36; Y02T 10/62; Y02T 10/70; Y02T 10/92; H04B 5/00; H04B 5/0037; H04B 5/0075; H04B 5/0087
See application file for complete search history.

(56) References Cited

U.S. PATENT DOCUMENTS

| 5,669,470 | A | * | 9/1997 | Ross | B60L 53/126 320/109 |
|---|---|---|---|---|---|
| 9,356,659 | B2 | | 5/2016 | Partovi | |
| 9,758,048 | B2 | * | 9/2017 | Ueda | B60L 53/31 |
| 9,873,346 | B2 | * | 1/2018 | Maekawa | B60L 53/36 |
| 2003/0200025 | A1 | * | 10/2003 | Ross | B60L 53/124 701/22 |
| 2012/0187773 | A1 | * | 7/2012 | Wechlin | H02J 7/342 307/104 |
| 2014/0117930 | A1 | * | 5/2014 | Imazu | B60L 53/126 320/108 |
| 2016/0221461 | A1 | * | 8/2016 | Obayashi | H02J 50/80 |
| 2017/0120759 | A1 | * | 5/2017 | Lee | H02M 7/217 |
| 2020/0180459 | A1 | * | 6/2020 | Nagata | B60L 53/38 |
| 2020/0307403 | A1 | * | 10/2020 | Rastoll | H02J 50/10 |
| 2020/0321810 | A1 | * | 10/2020 | Okamoto | H02J 50/005 |
| 2020/0366132 | A1 | | 11/2020 | Covic et al. | |
| 2021/0078426 | A1 | * | 3/2021 | Bhat | H02J 50/402 |
| 2021/0197677 | A1 | * | 7/2021 | Terada | H02J 50/12 |

(Continued)

*Primary Examiner* — Drew A Dunn
*Assistant Examiner* — Mary G Bartlett
(74) *Attorney, Agent, or Firm* — Lee & Hayes, P.C.

(57) ABSTRACT

Wirelessly charging a vehicle battery may be performed using a plurality of charging coils. The offboard coils and the onboard coils may be spaced apart by different amounts, such that, when the vehicle is positioned in a vehicle charging space, at least one pair of an onboard coil and an offboard coil may still be substantially aligned for wireless charging, even when other coils are misaligned. The offboard coils may include sizes that are conducive to charge smaller capacity systems in some arrangements and are combinable to charge larger capacity systems in other arrangements. In addition, the use of relatively small coils may allow for flexibility in thermal management.

19 Claims, 6 Drawing Sheets

(56) References Cited

U.S. PATENT DOCUMENTS

| | | | |
|---|---|---|---|
| 2021/0316626 A1* | 10/2021 | Chase | B60L 53/12 |
| 2022/0203856 A1* | 6/2022 | Samuelsson | H02J 7/02 |
| 2022/0247233 A1* | 8/2022 | Mohammad | B60L 53/38 |
| 2022/0266708 A1* | 8/2022 | Sakai | G01C 21/3647 |
| 2022/0363149 A1* | 11/2022 | Copeland | B60L 53/126 |
| 2023/0081974 A1* | 3/2023 | Zeng | B60L 53/36 320/108 |
| 2023/0088727 A1* | 3/2023 | Seong | B60L 53/66 320/108 |
| 2023/0182598 A1* | 6/2023 | Chase | B60L 53/36 320/108 |
| 2023/0211678 A1* | 7/2023 | Sherman | B60L 58/21 320/109 |

* cited by examiner

MULTI-COIL INDUCTIVE CHARGING FOR VEHICLES

BACKGROUND

Vehicles (e.g., electric or hybrid) often rely on rechargeable batteries to supply electrical power to various components, such as electric motors. Batteries may be recharged using various technologies, including both contact-based solutions (e.g., via Type 1, Type 2, Combo, and CHAdeMO connections) and non-contact-based solutions (e.g., inductive charging). Non-contact-based solutions may provide some advantages (as compared to contact-based technologies), such as eliminating plugging/unplugging that may contribute to additional maintenance arising from component degradation (e.g., pin wear) and that may introduce safety risks and opportunities for user error.

However, some conventional inductive charging solutions may require an offboard coil (e.g., near the ground surface) and an onboard coil (e.g., secured underneath the vehicle) to be aligned within relatively tight tolerances (e.g., in order to efficiently transfer power), which can complicate the charging process and/or require additional components. In addition, conventional inductive charging solutions may require complex thermal management solutions for the coil(s) and/or for power electronics associated with the coils. Furthermore, some conventional inductive charging solutions may include components that are not flexibly configurable to charge various battery sizes having a range of capacities, which may limit usefulness and increase costs associated with more customized charging systems.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1A:
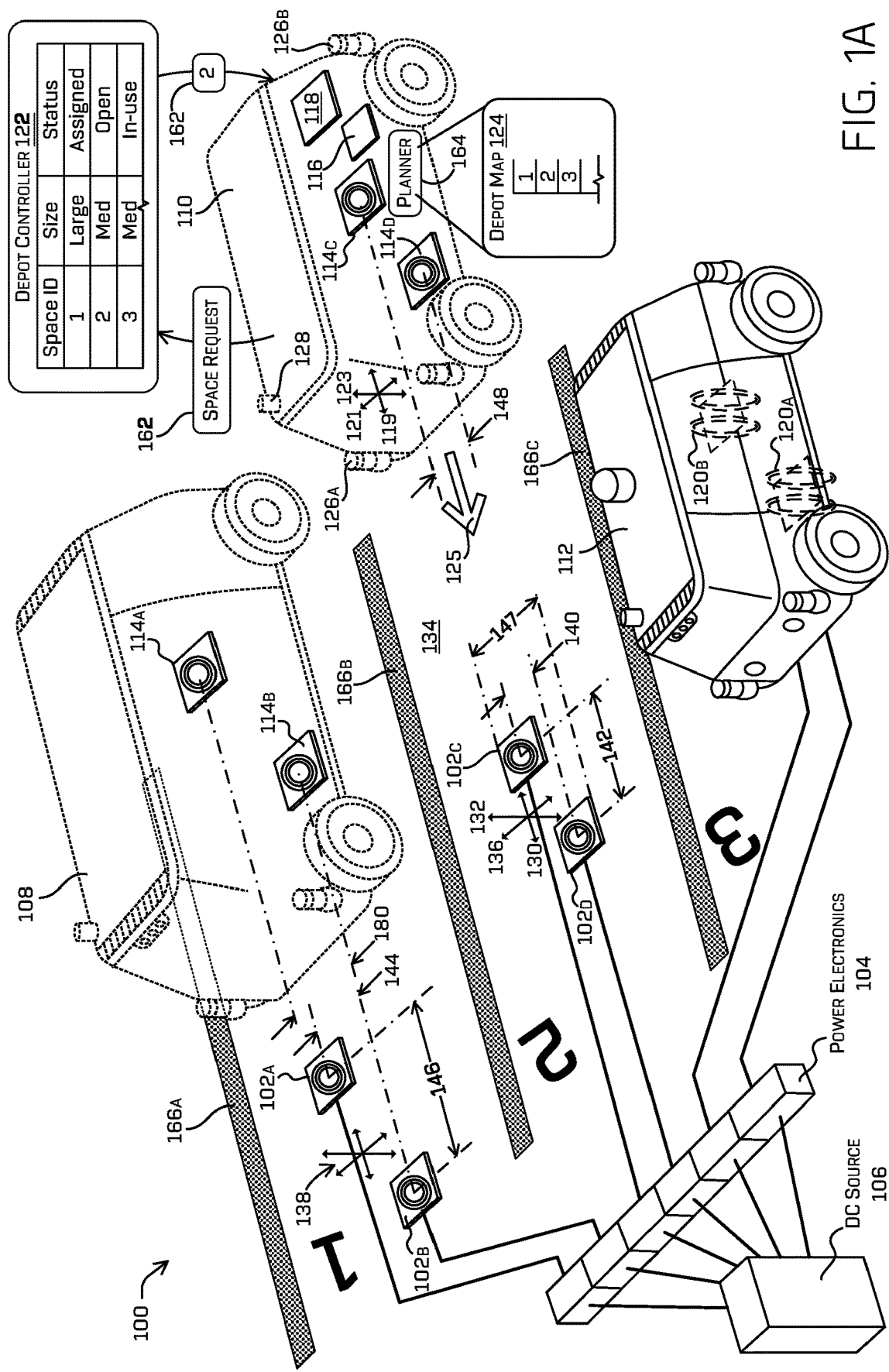
FIG. 1A is an example environment including a charging depot with multiple vehicle charging spaces and vehicles at different stages of charging or pre-charging.

As described above, various considerations factor into recharging a battery of a vehicle, such as convenience, maintenance, infrastructure, safety, efficiency, and/or cost. This disclosure relates to techniques for wirelessly charging a battery of a vehicle using a plurality of charging coils (e.g., coils that transfer power by a non-contact means, such as induction). For example, a charging system may include offboard coils arranged in a vehicle charging space, as well as onboard coils (e.g., secured to a vehicle undercarriage) that align with the offboard coils to wirelessly receive power. In examples of this disclosure, the offboard coils and the onboard coils may be spaced apart (e.g., laterally and/or longitudinally offset) by different amounts, such that, when the vehicle is positioned in the vehicle charging space, at least one pair of an onboard coil and an offboard coil may still be substantially aligned for wireless charging (e.g., non-contact charging), even when other coils are misaligned (e.g., the vehicle is not centered in the vehicle charging space). In some examples, individual offboard coils may be sized and/or powered to service a smallest (or lowest power capacity) vehicle in a fleet of vehicles, and multiple offboard coils (e.g., 2, 3, 4, or more) may be used on combination to charge larger (or higher power capacity) vehicles in the fleet. In this respect, the coils may be modular and may be arranged in a charging depot to charge various vehicles (e.g., a fleet of vehicles) having various sizes and/or power systems. In some examples, a single offboard coil may be configured to deliver a quantity of power (e.g., up to 50 kW of power). Thus, two offboard coils may be configured to collectively deliver a multiple of the quantity (e.g., 100 kW of power at 50 kW apiece) to a vehicle having two onboard coils, while three offboard coils may be configured to collectively deliver a different multiple of the quantity (e.g., 150 kW of power at 50 kW apiece) to a vehicle having three onboard coils, etc. In addition, the use of multiple relatively small coils may allow for more passive thermal management solutions (e.g., air cooled) than if fewer larger charge coils were used, even when multiple coils are used in combination to charge a single larger vehicle. In some examples, impedance detected by onboard charging coils (e.g., created by the presence of offboard charging coils) may be used to determine a trajectory of a vehicle, such as by determining that the vehicle is on track to align for charging or by determining the vehicle is misaligned and adjusting a trajectory.

In examples of this disclosure, as indicated above, one or more offboard coils (e.g., charging coils, induction coils, wireless charging coils, and the like) may be arranged in a vehicle charging space. A vehicle charging space may include a drivable surface (e.g., asphalt, concrete, gravel, pavement, etc.) on which a vehicle may maneuver or traverse in order to align onboard coils with the offboard coils. In addition, the vehicle charging space may include orientations, directions, or axes, such as a longitudinal direction along which the vehicle traverses when pulling into (or exiting from) the vehicle charging space (e.g., the direction aligned with ingress and egress), a vertical direction perpendicular to the drivable surface, and a lateral direction perpendicular to the vertical orientation and to the longitudinal orientation. In some examples, a vehicle charging space may include a first offboard coil and a second offboard coil spaced apart by a first distance in the lateral direction of the vehicle charging space. The first offboard coil and the second offboard coil may also be spaced apart in the longitudinal direction. In addition, a vehicle may include a first onboard coil and a second onboard coil spaced apart by a second distance in a lateral orientation of the vehicle, the first distance being different from the second distance. Stated differently, the offboard coil arrangement may be asymmetrical to the onboard coil arrangement based on the lateral offsets. As such, in examples of this disclosure, at least one pair of an onboard coil and an offboard coil may be substantially aligned, even where the other pair may be aligned to a lesser degree (e.g., wherein the vehicle is off center in the vehicle charging space). In such cases, the substantially aligned coils may still generate efficient recharging of a power storage unit of the vehicle. The other pair of coils (the lesser aligned pair) may also provide recharging of the power storage unit, though possibly at a slightly lower rate than the substantially aligned coils.

In other examples, when inductively charging the vehicle, the onboard coils may be misaligned with the offboard coils (e.g., either based on asymmetry of the coil arrangements or by maneuvering the vehicle into a misaligned position) to affect the amount of energy received by the onboard coils. For instance, to reduce the amount of energy received by onboard coils (e.g., based on onboard capacity, thermal management considerations, etc.) the onboard coils may be intentionally misaligned with the offboard coils.

In some examples, onboard charging coils and offboard charging coils may differ from one another in attributes other than offset. That is, as described above, the offboard coils may be different from the onboard coils based on asymmetrical offset and/or based on one or more other attributes. For example, onboard charging coils may have a different coil diameter than offboard charging coils, such that sufficient overall coil alignment may still exist, even if the coil centers are misaligned and regardless of whether the offsets are asymmetrical.

In some examples, an individual offboard coil (or one or more offboard coils) may be configured to provide a quantity of power conducive to charging lower capacity power storage units (e.g., a smallest vehicle (or smallest storage capacity) in a fleet of vehicles to be serviced by the charging depot). For example, an offboard coil may include componentry (e.g., power electronics) configured to provide a quantity of power and/or a DC source may be controlled to provide a quantity of power. Furthermore, in addition to charging lower capacity units, the offboard coil may be combinable with one or more other offboard coils to collectively charge (e.g., in parallel) larger capacity power storage units. For example, an offboard coil may be configured to provide a quantity of power (e.g., up to 50 kW0, which may be conducive to charging lower capacity power storage units. In addition, the offboard coil may be combinable with one or more other offboard coils (e.g., arranged in a vehicle charging space or an adjacent vehicle charging space) to charge in parallel a larger capacity power storage unit, which may receive higher quantities of power (e.g., 100 kW, 150 kW, etc.). Furthermore, the size of the offboard coil may be configured as a factor (e.g. 1×, 2×, 3×, etc.) of sizes of vehicle power storage units. For example, if vehicle power storage units are configured to receive 50 kW, 100 kW, or 150 kW, then offboard coils may be configured to provide 50 kW, such that offboard coils can be combined into different sized coil sets for efficient power supply (e.g., sets of 1, 2, or 3 coils). In some examples, vehicle power storage units may be rated to receive other quantities of power (e.g., 60 kW, 120 kW, or 180 kW), in which case the offboard coils may be configured accordingly (e.g., to provide up to 60 kW or an amount in a range of 40 kW to 60 kW) to be combinable in different sized sets. Among other things, using a coil size that is a factor of power storage unit capacities allows for modularity, extensibility, and common componentry across varied charging station sizes.

In some examples, a variety of different vehicle charging spaces may be arranged in a charging depot for charging a variety of different vehicles. For example, a charging depot may include smaller charging spaces (e.g., single coil or two closely spaced coils) for smaller vehicles (e.g., scooters, autonomous delivery bots/vehicles, single-person vehicles, etc.), medium charging spaces (e.g., two spaced apart coils) for medium sized vehicles (e.g., multi-passenger vehicle), and larger charging spaces (e.g., two further spaced apart coils or more than two coils) for larger vehicles (e.g., vans, busses, trucks, etc.). As mentioned above, in aspects of this disclosure, offboard coils may be arrangeable in coil sets having various coil quantities (e.g., single coil, two coils, three or more coils), which may provide flexibility when designing a charging depot. In addition to varied coil spacing and/or varied coil quantities, charging spaces may differ in other respects, such as coil size and/or an amount of power received by a coil from a DC source. As such, a charging depot may be customized to provide wireless charging to a vehicle fleet or to a customer base having a variety of different vehicle types, and the ability of the offboard coils to be combined in different arrangements may provide flexibility in determining what size of vehicle charging spaces (and respective quantities) to include in the charging depot.

In some examples, a size of coils used in the charging system may be conducive to various thermal management solutions. That is, in use, charging coils and related components (e.g., power electronics) may generate heat quantities warranting some form of cooling. In examples of this disclosure, the coil sizes may be small enough to be sufficiently cooled using passive cooling techniques (e.g., ambient air), which may be less expensive than more complex or active cooling systems, yet the combinability of the coils allows for the charging of higher capacity systems.

In at least some examples, a vehicle trajectory may be based on one or more impedances detected by at least one onboard charging coil. For instance, an impedance detected at an onboard coil (and/or relative differences in impedances between multiple onboard coils (either at an instant in time or as the vehicle moves)) may be used to determine a location of the onboard coil relative to an offboard coil (e.g., higher impedance may indicate a better alignment and lower impedance may indicate at least some misalignment). In addition, a vehicle trajectory may be determined based on the relative location. In some examples, impedances detected at multiple coils may be used to estimate the location of the vehicle relative to the vehicle charging space and to determine a trajectory of the vehicle.

The techniques described herein can be implemented in a number of ways to affect a multi-coil charging system for a vehicle. Example implementations are provided below with reference to the following figures. Example implementations are discussed in the context of autonomous vehicles; however, the methods, apparatuses, and components described herein can be applied to a variety of components (e.g., charging a battery in a robotic system), and are not limited to autonomous vehicles. For instance, the techniques described herein may be utilized in driver-controlled vehicles electric vehicles. Additionally, or alternatively, the techniques can be utilized in connection with charging batteries of land vehicles, watercraft, aircraft, robots, computing devices, or any other battery powered device.

FIG. 1A is an example charging-depot environment 100 (e.g., charging site) with multiple vehicle charging spaces (e.g., space "1" and space "2" and space "3"), and each vehicle charging space is configured to wirelessly charge a vehicle (e.g., a power storage unit of a vehicle). For example, each vehicle charging space includes respective offboard coils (e.g., 102a, 102b, 102c, 102d, or collectively "offboard coils 102" or "coils 102" or "offboard charging coils"), which are coupled to power electronics 104 and a direct current (DC) source 106. In examples, the DC source 106 may provide DC power to the power electronics 104, which may convert the DC power to alternating current (AC) and supply the AC to the offboard coils 102. For instance, each of the offboard coils 102 may be coupled to its own dedicated power converter (e.g., bidirectional converter, inverter, etc.). The offboard coils 102 may then use the AC to inductively power onboard coils associated with a vehicle. Although only one DC source 106 is depicted in FIG. 1, in other examples, the environment 100 may include multiple DC sources, and in some cases, may include a single DC source (e.g., DC charging station) for each coil and/or for each vehicle charging space. For example, in some instances, each offboard coil with respective power electronics may include an adapter with a connector that couples to a DC fast charger plug, as described in in U.S. application Ser. No. 17/334,275 (titled "DC Fast Charger Wireless-Charging Adapter" and filed May 28, 2021), which is incorporated herein by reference in its entirety and for all purposes.

In addition, FIG. 1A depicts a first vehicle 108, a second vehicle 110, and a third vehicle 112, and each of the vehicles 108, 110, and 112 includes onboard coils (e.g., 114a, 114b, 114c, 114d, or collectively "onboard coils 114" or "coils 114" or "onboard charging coils") for wireless charging with the offboard coils 102. In addition, each vehicle may include power electronics (e.g., the element identified with reference numeral 116 represents power electronics units of the vehicle 110), such as a bidirectional converter, inverter, rectifier, etc. coupled to each onboard coil, as well as a power storage unit 118 (e.g., battery) for storing energy. In examples, each vehicle may include a single power electronics unit (e.g., 116 of the vehicle 110), which receives AC from multiple onboard coils and converts the AC to DC that is transmitted to the power storage unit (e.g., 118 of the vehicle 110). In some examples, the power electronics unit may also convert DC from the power storage unit to AC, which is provided (e.g., perturbated) to the onboard coils. In FIG. 1A, each of the vehicles 108, 110, and 112 is illustrated in a respective stage of the charging process. For example, the vehicle 112 is receiving a wireless charge (e.g., as indicated by the energy fields 120a and 120b shown in broken lines) via coils of the charging space 3; the vehicle 108 is maneuvering into the vehicle charging space 1; and the vehicle 110 is requesting (e.g., via a depot controller 122) access or assignment to a vehicle charge space, receiving an assignment to the vehicle charging space 2, and determining a trajectory (e.g., represented by the arrow 125) to maneuver into the vehicle charging space 2 based on a stored depot map 124.

The example vehicles 108, 110, and 112 may be any configuration of vehicle, such as, for example, a van, a sport utility vehicle, a cross-over vehicle, a truck, a bus, an agricultural vehicle, and a construction vehicle. The vehicles 108, 110, and 112 may be powered by one or more electric motors, one or more internal combustion engines, any combination thereof (e.g., by a hybrid power train), and/or any other suitable electric power sources. For the purpose of illustration, the example vehicles 108, 110, and 112 are an at least partially electrically powered vehicle having two electrical propulsion units configured to provide the vehicles 108, 110, and 112 with the ability to maneuver, each including a motor/inverter electrically coupled to one or more batteries configured to be recharged, as explained herein. For example, the vehicles 108, 110, and 112 may be a bidirectional vehicle having a first drive module positioned in a front end and a second drive module positioned in a rear end. As used herein, a bidirectional vehicle is one that is configured to switch between traveling in a first direction of the vehicle and a second, opposite, direction of the vehicle. In other words, there is no fixed "front" or "rear" of the vehicles 108, 110, and 112. In other examples, the techniques described herein may be applied to vehicles other than bidirectional vehicles and/or vehicles other than those depicted (e.g., scooters, mopeds, motorcycles, delivery carts, etc.). In addition, for reference in this disclosure, a vehicle may include a longitudinal axis 119 extending along a front-to-back orientation (e.g., longitudinal orientation) and a lateral axis 121 extending along a side-to-side orientation (e.g., lateral orientation) and substantially perpendicular to the longitudinal axis 119. Furthermore, a vertical axis 123 may extend top-to-bottom (e.g., vertical orientation) and perpendicular to the longitudinal axis 119 and to the lateral axis 121.

The vehicles 108, 110, and 112 may also include sensors (e.g., 126a and 126b), which may include a perception sensor, including a sensor capturing data of an environment around the vehicle (e.g., lidar, camera, time-of-flight, sonar, radar, etc.). In addition, the vehicles 108, 110, and 112 can also include one or more communication units (e.g., 128) that enable communication between the vehicle and one or more other local or remote computing devices via one or more protocols. For example, the vehicles 108, 110, and 112 may exchange communications with other devices in the environment 100 (e.g., the DC source 106, the power electronics 104, the coils 102, the depot controller 120 (e.g., charging-site controller), or other vehicles) and/or with remote devices (e.g., a remote teleoperation computing device). In examples, the power electronics 104 may include a power converter and signals may be exchanged between onboard-side components and the power converter or other offboard-side components, as described in in U.S. application Ser. No. 17/334,275 (titled "DC Fast Charger Wireless-Charging Adapter" and filed May 28, 2021), which is incorporated herein by reference in its entirety and for all purposes. In some examples, the onboard-side components may exchange signals with the offboard-side components via one or more components or operations described in U.S. application Ser. No. 16/214,826 (titled "Charge Coupler and Method for Autonomously Charging Vehicle Batteries" and filed Dec. 10, 2018), which is incorporated herein by reference in its entirety and for all purposes. Communications may be exchanged via physical and/or logical interfaces. For example, the communication unit 128 may enable Wi-Fi-based communication such as via frequencies defined by the IEEE 802.11 standards, short range wireless frequencies (e.g., Bluetooth, Zigbee, etc.), cellular communication (e.g., 2G, 3G, 4G, 4G LTE, 5G, etc.), satellite communication, dedicated short range communications (DSRC), or any suitable wired or wireless communications protocol that enables the respective vehicle to interface with the other computing device(s). These are just some examples of sensors, and the vehicle may include other sensors, such as those described with respect to the system 500.

In examples of this disclosure, each of the vehicle charging spaces may include various orientations or directions. For instance, the vehicle charging space 2 can include a longitudinal direction 130 along which the vehicle 110 may maneuver when entering the vehicle charging space 2. In addition, the vehicle charging space 2 may include a vertical direction 132 extending generally perpendicular to the drivable surface 134 (e.g., asphalt, concrete, gravel, pavement, etc.) and a lateral direction 136 extending generally perpendicular to the longitudinal direction 130 and the vertical direction 132. Each of the other charging spaces may include similar orientations or directions (e.g., as depicted by the 3D orientation arrows 138 near the vehicle charging space 1).

In additional examples of this disclosure, a vehicle charging space may include at least two offboard coils that are spaced apart by a distance in at least one direction. For example, referring to both FIG. 1A and FIG. 2, the vehicle charging space 2 includes the offboard coil 102c and the offboard coil 102d spaced apart from one another by a distance 140 (e.g., coil center to coil center) in the lateral direction 136 and by a distance 142 in the longitudinal direction 130 (e.g., coil center to coil center). In FIG. 1A, the offboard coils 102a and 102b of the vehicle charging space 1 are also offset by distances 144 and 146 in the lateral and longitudinal directions (as well as the coils of vehicle charging space 3 that are obscured from view).

Figure 2:
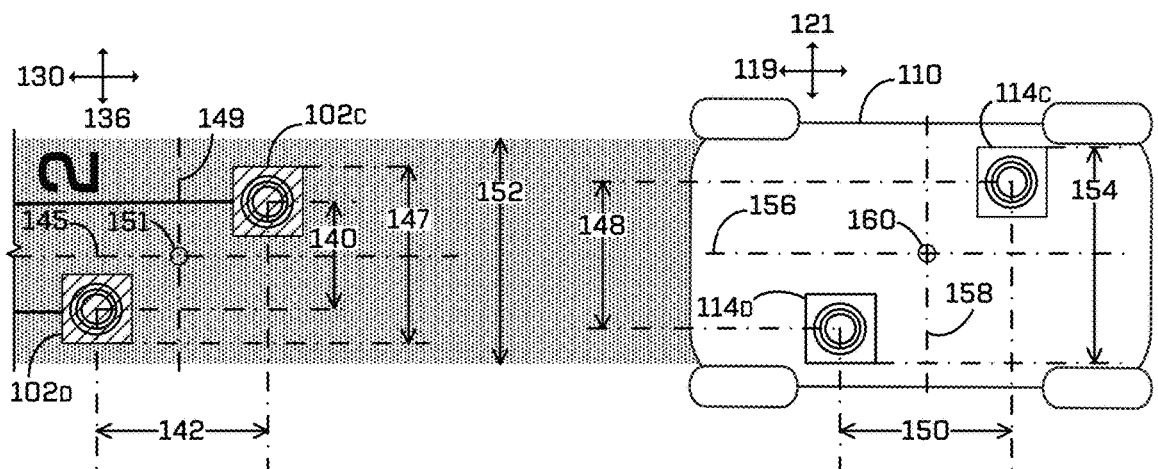
FIG. 2 is a top down view of a vehicle charging space and a vehicle, each with respective coils that are offset.

The offboard coils (or the arrangement of the offboard coils) may include other dimensions that may be used to define or describe the coil arrangement and/or the vehicle charging space. For example, the offboard coils 102c and 102d include a lateral footprint width of 147, which extends from the lateral-most edge of one coil 102c to the lateral-most edge of the other coil 102d (the offboard coils 102a and 102b also including a respective lateral footprint width). In other examples, the vehicle charging space 2 (or the offboard coil arrangement) may include an offboard longitudinal midline 145 (e.g., FIG. 2) that bisects the lateral offset 140 between the offboard coils 102c and 102d, as well as an offboard lateral midline 149 that bisects the longitudinal offset 142 between the offboard coils 102c and 102d. The offboard longitudinal midline 145 may intersect with the offboard lateral midline 149 at a center 151 of the vehicle charging space 2. In FIG. 1A and FIG. 2, the offboard coils within each vehicle charging space are offset in multiple orientations (e.g., both longitudinally and laterally), and in other examples, the coils may be offset in a single orientation (e.g., only offset laterally while being aligned in the longitudinal orientation or vice versa).

The offset distance(s) between the offboard coils 102c and 102d may be configured based on various factors. For instance, in some examples of the disclosure, the offset distance(s) may be based on attributes of a vehicle to be charged using the offboard coils 102c and 102d. That is, in some instances, the vehicle charging space 2 in which the coils 102c and 102d are arranged may be configured to charge vehicles having certain attributes, and as such, the offboard coils 102c and 102d may be configured accordingly. In some instances, the coils 102c and 102d may be offset by a distance configured to increase a likelihood that at least one of the offboard coils 102c and 102d will sufficiently align with at least one of the onboard coils 114c and 114d by an amount intended to facilitate efficient wireless charging. For example, as explained below, the offboard coils 102c and 102d may be laterally offset by a distance shorter than an offset of the onboard coils 114c and 114d. In other examples, the offboard coils 102c and 102d may be positioned to reduce a likelihood of being driven over by tires (or treads or tracks) of the vehicle 110. For example, the offboard coils 102c and 102d may be laterally offset by a distance intended to position both coils inside a track width of the vehicle. In some examples the offboard coils 102c and 102d are offset by a distance that is both shorter than the track width and shorter than the lateral offset of the onboard coils. In some examples, the offset may be used to estimate a location (e.g., of the vehicle relative to the offboard coils and/or to the vehicle charging space).

In FIG. 2, a top down view of the vehicle charging space 2 and the vehicle 110 are depicted to show attributes associated with a charging system, including some factors that may affect coil offset(s) (some of which are also shown in FIG. 1A). For example, onboard coils of a vehicle may be spaced apart in one or more orientations of the vehicle. More specifically, in FIG. 2, the onboard coils 114d and 114c of the vehicle 110 are spaced apart by a distance 148 (e.g., coil center to coil center) in the lateral orientation 121 of the vehicle 110 and are spaced apart by a distance 150 (e.g., coil center to coil center) in the longitudinal orientation 119 of the vehicle 110. The positioning of the coils 114c and 114d may be based on various factors, such as weight distribution of coils on the vehicle, available space and clearance afforded or required by other vehicle components, protection from debris, and charging considerations. In addition, FIG. 2 depicts a track width 152 of the vehicle 110 that is measured from an inside wall of one wheel to an inside wall of an opposing wheel (as opposed to measuring from a centerline of one wheel to an opposing wheel centerline). The track width 152 may include various lengths, depending on the vehicle. In examples of this disclosure, the track width 152 may be in a range of lengths between about 45 cm (e.g., for smaller vehicles, delivery bots, etc.) and about 260 cm (e.g., for larger vehicles, delivery trucks, semi-trucks, etc.); or in a range of lengths between about 125 cm and about 170"; or about 150 cm.

The onboard coils (or the arrangement of the onboard coils) may include other dimensions that may be used to define or describe the coil arrangement and/or the vehicle. For example, the onboard coils 114c and 114d include a lateral footprint width of 154, which extends from the lateral-most edge of one coil 114c to the lateral-most edge of the other coil 114d. In some examples, the lateral footprint width 154 may be relative to the track width 152. For example, the lateral footprint width 154 may be substantially similar to the track width 152. In some examples, the lateral footprint width 154 may be shorter than the track width 152, such as when the onboard coils 114c and 114d are spaced apart inwardly and away from the inside walls of the tires. For example, each onboard coil 114c and 114d may be inwardly offset away from the inside wall of the tire by a distance in a range of about 3 cm to about 30 cm, in which examples the lateral footprint width 154 would be shorter than the track width 152 by a distance in a range of about 6 cm to about 60 cm.

In some examples, the onboard coil arrangement may include an onboard longitudinal midline 156 that bisects the lateral offset 148 between the onboard coils 114c and 114d, as well as an onboard lateral midline 158 that bisects the longitudinal offset 150 between the onboard coils 114c and 114d. In some examples, the onboard longitudinal midline 156 may align with a vehicle longitudinal midline (not depicted) and/or the onboard lateral midline 158 may align with a vehicle lateral midline (not depicted). The onboard longitudinal midline 156 may intersect with the onboard lateral midline 158 at a center 160 of the onboard coil arrangement. In FIG. 1A and FIG. 2, the onboard coils are offset in multiple orientations, and in other examples, the coils may be offset in a single orientation (e.g., only offset laterally while being aligned in the longitudinal orientation or vice versa).

In examples of the present disclosure, the offboard coils 102c and 102d and the onboard coils 114c and 114d may be asymmetrical in one or more respects. In some examples, the offboard coils are laterally offset by a distance 140 that is different than a distance 148 by which the onboard coils 114c and 114d are offset. For example, in FIG. 2, the distance 140 is less than the distance 148. In other examples, the distance 140 may be greater than the distance 148. In some examples, the offsets may be substantially similar (e.g., symmetrical), and the coils may be asymmetrical in other respects, such as coil size (e.g., the onboard coils may be larger than the offboard coils, or vice versa). In some examples, the offsets and coil sizes may be asymmetrical. Among other things, asymmetry between the offboard coils and the onboard coils, such as laterally offsetting the offboard coils and onboard coils by different distances, may increase a likelihood that at least one pair of an onboard coil and an offboard coil may be substantially aligned, even where the other pair may be aligned to a lesser degree (e.g., where the vehicle is off center in the vehicle charging space). In such cases, the substantially aligned coils may still generate efficient recharging of a power storage unit of the vehicle. The other pair of coils (the lesser aligned pair) may also provide recharging of the power storage unit, though possibly at a slightly lower rate than the substantially aligned coils.

In examples of this disclosure, coil misalignment (e.g., between onboard coils and offboard coils) may arise under various circumstances (e.g., even where constrained by physical devices, such as ramps, guides, etc., the vehicle may still be offset from the coils). For example, a non-autonomous vehicle may be operated in a manner that misaligns the coils when an operator attempts to position the vehicle in a vehicle charging space. In some examples, a partially autonomous vehicle (e.g., with parking assist) may be operated in a manner that misaligns the coils when the parking system attempts to position the vehicle in a vehicle charging space. In some examples, an autonomous vehicle may execute a trajectory that misaligns the coils when the vehicle is maneuvered into a vehicle charging space.

Referring to FIG. 1A, an example of a partially autonomous or fully autonomous vehicle is provided in which the vehicle 110 may enter the charging depot environment 100 to wirelessly charge the power storage unit 118. Upon entering the environment 100, the vehicle may (e.g., using the communication unit 128) send a communication 162 to the depot controller 120 (e.g., remote computing device or cloud-based service). Among other things, the communication 162 may include a request to access a vehicle charging space, a vehicle identifier, and information describing the charging system of the vehicle (e.g., capacities, coil spacing, etc.). In some instances, the depot controller 120 may be able to perform a lookup function (e.g., based on a vehicle identifier) to determine vehicle charging system details. Based on the charging system of the vehicle 110 or the vehicle identifier, the depot controller may determine a vehicle charging space that is available (e.g., not currently assigned to another vehicle, in-use by another vehicle, currently charging, etc.) and is configured to wirelessly charge the vehicle charging system and send the vehicle a communication 162 identifying the vehicle charging space (e.g., "2"). In addition, based on the information associated with the vehicle charging system (e.g., either provided by the vehicle 110 to the controller 120 or/and retrieved by the controller 120), the controller 120 may control (e.g., via a signal to the DC source and/or the relevant power electronics 104) the amount of power inductively transferrable from offboard coils (e.g., of the assigned vehicle charging space) to the vehicle 110. The communication 162 may include location information or other details that enable the vehicle 110 to determine a location of the assigned vehicle charging space. For example, the vehicle 110 may determine a location of the vehicle charging space 2 using a stored map 124 and may use a planner 164 to determine a trajectory to the vehicle charging space 2. In some examples, the charging depot 100 and/or the charging spaces may include elements that assist with trajectory determination or other operations of the planner 164. For example, the markings 166a, 166b, and 166c (e.g., lane lines) on the driving surface 134 (and/or other fiducials, markers, features, etc.) may be used by a perception system of the vehicle 110 to determine a vehicle charging space and/or determine other features of a vehicle charging space (e.g., a longitudinal midline or center) based on known (e.g., stored) dimensions related to the vehicle charging space. In some instances, the trajectory may result in a coil misalignment (or likely misalignment) between onboard and offboard coils.

Figure 3A:
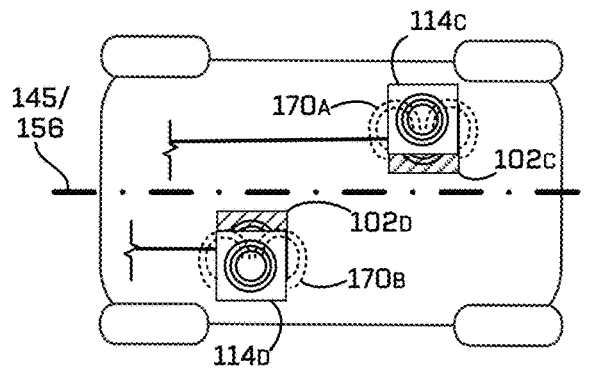
FIGS. 3A-3C illustrate top down views of various coil positions that may be sufficiently aligned to wirelessly charge a power storage unit of a vehicle.

As indicated above, in examples of this disclosure, even though onboard and offboard coils may be at least partially misaligned, the charging system may still wirelessly charge the power storage unit of a vehicle. For example, referring to FIG. 3A, the vehicle 110 is depicted after maneuvering into the vehicle charging space 2. In FIG. 3A, the trajectory or maneuver performed by the vehicle (e.g., manually or autonomously) has aligned the offboard longitudinal midline 145 with the onboard longitudinal midline 156, and as such, the offboard coil 102c is at least partially aligned with the onboard coil 114c and the offboard coil 102d is at least partially aligned with the onboard coil 114d. As indicated by the energy fields 170a and 170b, the offboard coils 102c and 102d may wirelessly charge the onboard coils 114c and 114d.

Figure 3B:
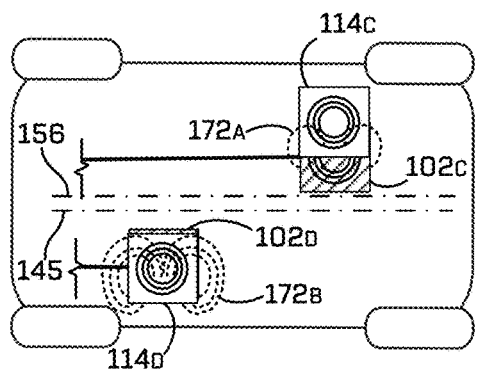

FIG. 3A depicts an example scenario in which the midlines 145 and 156 are aligned (e.g., in the lateral orientation); however, in other instances, the vehicle 110 may enter the vehicle charging space 2 misaligned or off-centered to the right or to the left. For example, referring to FIG. 3B, the vehicle 110 is depicted after maneuvering into the vehicle charging space 2. In FIG. 3B, the trajectory or maneuver performed by the vehicle (e.g., manually or autonomously) has offset or misaligned the offboard longitudinal midline 145 from the onboard longitudinal midline 156, and as such, the offboard coil 102c includes a lower extent of alignment (as compared with the alignment in FIG. 3A) with the onboard coil 114c (e.g., based on a lateral and/or longitudinal distance from coil centers and/or coil overlap). However, based on the lateral distances 140 and 148 being different, the offboard coil 102d includes a higher degree of alignment with the onboard coil 114d (e.g., based on a lateral and/or longitudinal distance from coil centers and/or coil overlap). As indicated by the energy fields 172a and 172b, the onboard charging system may still be efficiently charged with the onboard coil 114d receiving more power than the onboard coil 114c.

Figure 3C:
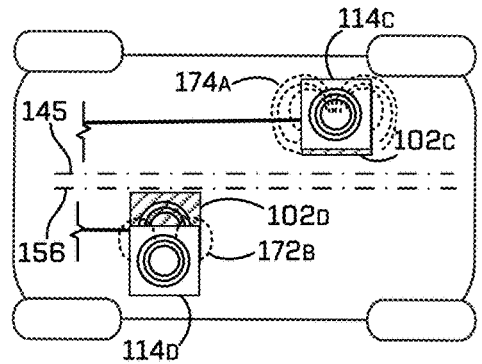

Referring to FIG. 3C, FIG. 3C depicts another example of the vehicle 110 after maneuvering into the vehicle charging space 2. In FIG. 3C, the trajectory or maneuver performed by the vehicle (e.g., manually or autonomously) has offset or misaligned the offboard longitudinal midline 145 from the onboard longitudinal midline 156, and as such, the offboard coil 102d includes a lower degree of alignment (as compared with the alignment in FIG. 3A and FIG. 3B) with the onboard coil 114d (e.g., based on a lateral and/or longitudinal distance from coil centers and/or coil overlap). However, based on the lateral distances 140 and 148 being different, the offboard coil 102c includes a higher degree of alignment with the onboard coil 114c (e.g., based on a lateral and/or longitudinal distance from coil centers and/or coil overlap). As indicated by the energy fields 174a and 174b, the onboard charging system may still be efficiently charged with the onboard coil 114c receiving more power than the onboard coil 114d.

In some examples, coil misalignment may be intentional. For example, coil misalignment may help control an amount of power received by the onboard coils. That is, in some instances, offboard coils may be configured to provide a first quantity of power that is higher than a quantity of power receivable by the onboard coils. As such, the onboard coils may be intentionally misaligned with the offboard coils to reduce the amount of power received by the onboard coils. Intentional misalignment may be accomplished using one or more approaches, such as by planning and executing a trajectory intended to misalign the vehicle in the charging space and/or by asymmetric offsets as between the onboard and offboard coils.

In examples of the disclosure, the arrangement of the offboard coils 102c and 102d may be based on other factors. For instance, in some examples, the width 147 of the lateral footprint may be less than the track width 152 of the vehicle. Among other things, the narrower width 147 may reduce the likelihood that one of the offboard coils 102c or 102d will be driven across by a wheel of the vehicle 110 when the vehicle 110 is pulling into or exiting the vehicle charging space.

In some examples, the difference between the lateral offset of offboard coils and the lateral offset of onboard coils may be based on the maneuverability and/or accuracy of the vehicle. For example, some vehicles are more maneuverable or can more accurately plan and execute a trajectory to a vehicle charging space, whereas other vehicles are less maneuverable and/or are less capable of planning and executing accurate trajectories. Examples of the former may include smaller vehicles (e.g., smaller wheel base and or track width), vehicles with four-wheel steering, etc., and examples of the latter may include larger vehicles (e.g., vans, busses, etc.) In the former case, there may be a lower likelihood of misalignment between the vehicle and the charging space (as compared with the latter case), and as such, with the former case, the difference between the lateral offset of offboard coils and the lateral offset of onboard coils may be lower. Creating a smaller difference (but still some difference) may optimize the system more towards higher alignment at both coils, while still allowing for some misalignment, since these vehicles may maneuver in a more predictable manner. In contrast, with less maneuverable vehicles or less accurate vehicles, there may be a higher likelihood of misalignment between the vehicle and the charging space, and as such, the difference between the lateral offset of offboard coils and the lateral offset of onboard coils may be higher. Creating a larger difference may optimize the system more towards good alignment between at least one pair of an offboard coil and an onboard coil, since there is a higher likelihood that the vehicle may be offset in the vehicle charging space.

The offset difference or offset variance (e.g., the difference or asymmetry between the width 140 and the width 148) may be quantified in various manners. For instance, in examples, the offset difference may be in a range of values. In some examples, the offset difference is in a range of about 50 mm to about 150 mm; in a range of about 75 mm to about 125 mm; or in a range of about 90 mm to about 110 mm. In some examples, the offset may be about 100 mm. In some examples, the offset difference may be described as a ratio of the distance by which the offboard coils are spaced apart from one another in the lateral orientation of the charging space to the distance by which the onboard coils are spaced apart from one another in the vehicle lateral orientation. For example, if the width 140 is 40 cm and the width 148 is 50 cm, then the offset difference may be described as a ratio of 1:1.25. In some examples of this disclosure, a ratio of the offset difference may be in a range of about 1:1.05 to about 1:1.50; in a range of about 1:1.10 to about 1:1.40; or in a range of about 1:1.20 to about 1:1.30. In some examples, the ratio of the offset difference may be about 1:1.25. In some examples, the a ratio of the offset difference may be lower than 1:1.05 or greater than 1:1.50.

The offset difference may be based on a variety of different factors. As described above, the offset difference may be based on the maneuverability of a vehicle. That is, the more maneuverable and/or more accurate a vehicle, the closer the offset difference may be to 1:1. The offset difference may also depend on other factors. For example, the offset difference may be based on a size of the coil, such that smaller coils may be closer to 1:1 than larger coils, since with smaller coils, if the offset difference is too large, there is a higher probability that none of the coils will sufficiently align for charging.

In FIGS. 1A, 2, and 3A-3C, the onboard coils are offboard coils may include similar spacing in the respective longitudinal orientations. That is, the offset distance 142 of the offboard coils 102c and 102d in the longitudinal orientation 130 may be similar to the offset distance 150 of the onboard coils 114c and 114d in the longitudinal orientation 119. The offset distances 142 and 150 may be configured similarly based on various factors. For example, in some instances, a vehicle is may more easily maneuver and/or adjust a position in the longitudinal orientation by simply traversing in various increments in forward or reverse. As such, more granular or fine adjustments may be executed once a vehicle is at the vehicle charging space by traversing forward, rearward, or laterally (e.g., by "crabbing") to achieve relatively high degrees of alignment at both coils. However, in some instances, the offset distance 142 of the offboard coils 102c and 102d in the longitudinal orientation 130 may be different than the offset distance 150 of the onboard coils 114c and 114d in the longitudinal orientation 119 (e.g., similar to the offset difference in the lateral orientation).

As described in other portions of this disclosure, a vehicle charging depot (e.g., 100) may be configured to charge a variety of different vehicle types, each having different attributes (e.g., size, power system capabilities, maneuverability, automation, etc.). Moreover, charging coils that are combinable to meet various charging demands, may provide flexibility in charging-depot design. For example, referring to FIG. 1A, the vehicle 108 is larger than the vehicle 110. As such, the vehicle 108 may have a larger power storage unit, may be less maneuverable, may have different onboard coil spacing 180, etc. In accordance with aspects of the present disclosure, the vehicle charging station 1 may be configured differently than the vehicle charging station 2 to increase the potential usability of the vehicle charging station 1 with vehicles similar to the vehicle 108. For example, the lateral offset 144 of the coils 102a and 102b may be larger than the lateral offset 140 of the coils 102c and 102d. In addition, the offset difference of the width 144 to the width 180 may include a different ratio than the offset difference of the width 140 to the width 148. Furthermore, although the charging space 1 is illustrated in FIG. 1A with only two offboard coils 102a and 102b and two onboard coils 114a and 114b, in other examples the charging system may include additional offboard coils (e.g., three coils, four coils, etc.) in the charging space 1 and additional onboard coils coupled to the vehicle 108. As indicted in other portions of the description, the number of coils may be based on a first amount of power providable by the coils (e.g., 50 kW) and a second amount of power receivable by the vehicles power storage unit (e.g., 150 kW, 200 kW, 250 kW, etc.), where the second amount is a multiple of the first amount (e.g., 3 coils that provide 50 kW to charge a 150 kW power storage unit).

Figure 1B:
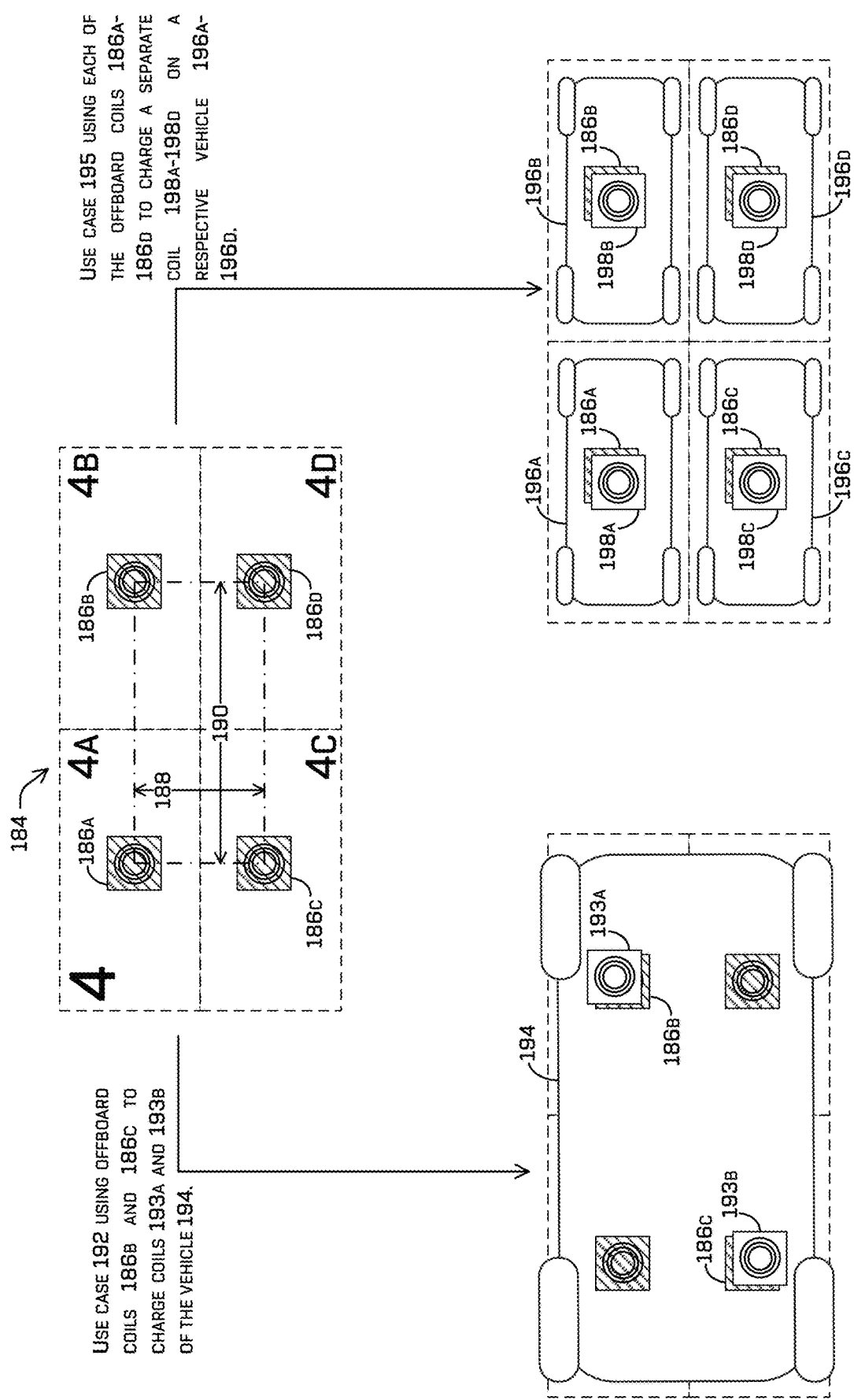
FIG. 1B is an example of a set of coils that may be arranged in the charging depot of FIG. 1A.

Referring to FIG. 1B, another example coil arrangement 184 (e.g., coil set) is illustrated that could be included in the charging depot 100. The coil arrangement 184 includes four offboard charging coils 186a-186d, each of which may be similar to the offboard charging coils 102. For example, the coil arrangement 184 could be part of another vehicle charging space (e.g., vehicle charging space "4"). In some examples, the vehicle charging space 1 may include the coils 102a and 102b, which correspond with coils 186b and 186c (respectively), as well as two additional offboard coils that are arranged similarly to the offboard charging coils 186a and 186d. In examples, each of the charging coils 186a-186d may include a size or be configured to inductively transfer up to an amount of power (e.g., 40 kW, 50 kW, 60 kW, etc.). In addition, the charging coils 186a-186d are spaced part by a distance 188 in a lateral direction and are spaced apart by a distance 190 in a longitudinal direction.

FIG. 1B illustrates a first use case 192 in which the coil arrangement 184 may be used in a manner similar to the coils 102c and 102d charging the coils 114c and 114d (or similar to the coils 102a and 102b charging the coils 114a and 114b). In this respect, the coil set 184 may be organized or identified as part of a vehicle charging space "4" configured to charge the onboard coils 193a and 193b of the vehicle 194, by using the offboard coils 186b and 186c. As described in other parts of this disclosure, the lateral offset 188 and/or the longitudinal offset 190 may be different than the spacing of the coils 193a and 193b on the vehicle 194. In addition, the spacing and/or lateral footprint of the coils 186a-186d may be less than a track width of the vehicle 194.

In addition, FIG. 1B illustrates that the coil arrangement 184 may also be used in a second use case 195, in which each of the offboard coils 186a-186d may be considered part of a respective vehicle charging space (e.g., 4a, 4b, 4c, and 4d) and may be used to charge a coil (e.g., onboard coils 198a-198d) of a vehicle 196a-196d. Each of the onboard coils 198a-198d may include a size and/or capacity that is similar to each of the offboard coils 186a-186d (e.g., both the offboard coils and the onboard coils may be sized to transfer 50 kW). In some examples, one or more of the onboard coils 198a-198d may include a difference size than the offboard coils 198a-198d. For example, an onboard coil may have a larger footprint or coil diameter, which may increase a likelihood of coil alignment, even where the vehicle is not centered. In some examples, the offboard coil may provide a quantity of power that is larger than a quantity of power receivable by the onboard coil, in which case the offboard coil power may be controlled using a DC source and/or by the coil power electronics; and/or the vehicle may be intentionally misaligned by an amount to reduce the power transfer. The use case 195 illustrates an example in which all four coils 186a-186d are being used at similar times to charge the coils 198a-198d. In some examples, three of the four coils 186a-186d may be used at the same time to charge coils on three different vehicles; two of the four coils 186a-186d may be used at the same time to charge coils on two different vehicles; and/or one of the coils 186a-186d may be used to charge a coil on one vehicle. Among other things, FIG. 1B illustrates flexibility of a charging system including components described herein. For example, each of the offboard coils 186a-186d including a size that is a factor of onboard systems (e.g., factor of 1×, 2×, 3×, etc.) permits the offboard coils 186a-186d to be used in different arrangements and combinations, such as by being used independently to charge a coil on a vehicle or by being combined to charge multiple coils on a vehicle. In addition, the lateral offset and spacing permits a single coil set (e.g., coil set 184) to be used in combination or divided into separate charging spaces.

As previously mentioned, the smaller size blocks of coils used in the charging system may be conducive to various thermal management solutions. That is, in examples of this disclosure, the coil sizes may be small enough to be sufficiently cooled using passive cooling techniques (e.g., ambient air), which may be less expensive than more complex or active cooling systems. For example, a larger onboard system (e.g., 100 kW or 150 kW) may be charged with multiple smaller offboard coils (e.g., each 50 kW), and the coils may be cooled without requiring a fan or cooling lines, and instead, may be cooled using ambient air. Among other things, this cooling flexibility may reduce costs associated with initial buildout, system infrastructure, maintenance, and the like. In some examples, a smaller size coil may be used in a system in which offset asymmetry exists between onboard coils and offboard coils. In some examples, a smaller size coil may be used in systems in which onboard coils and offboard coils are symmetrical.

Figure 4A:
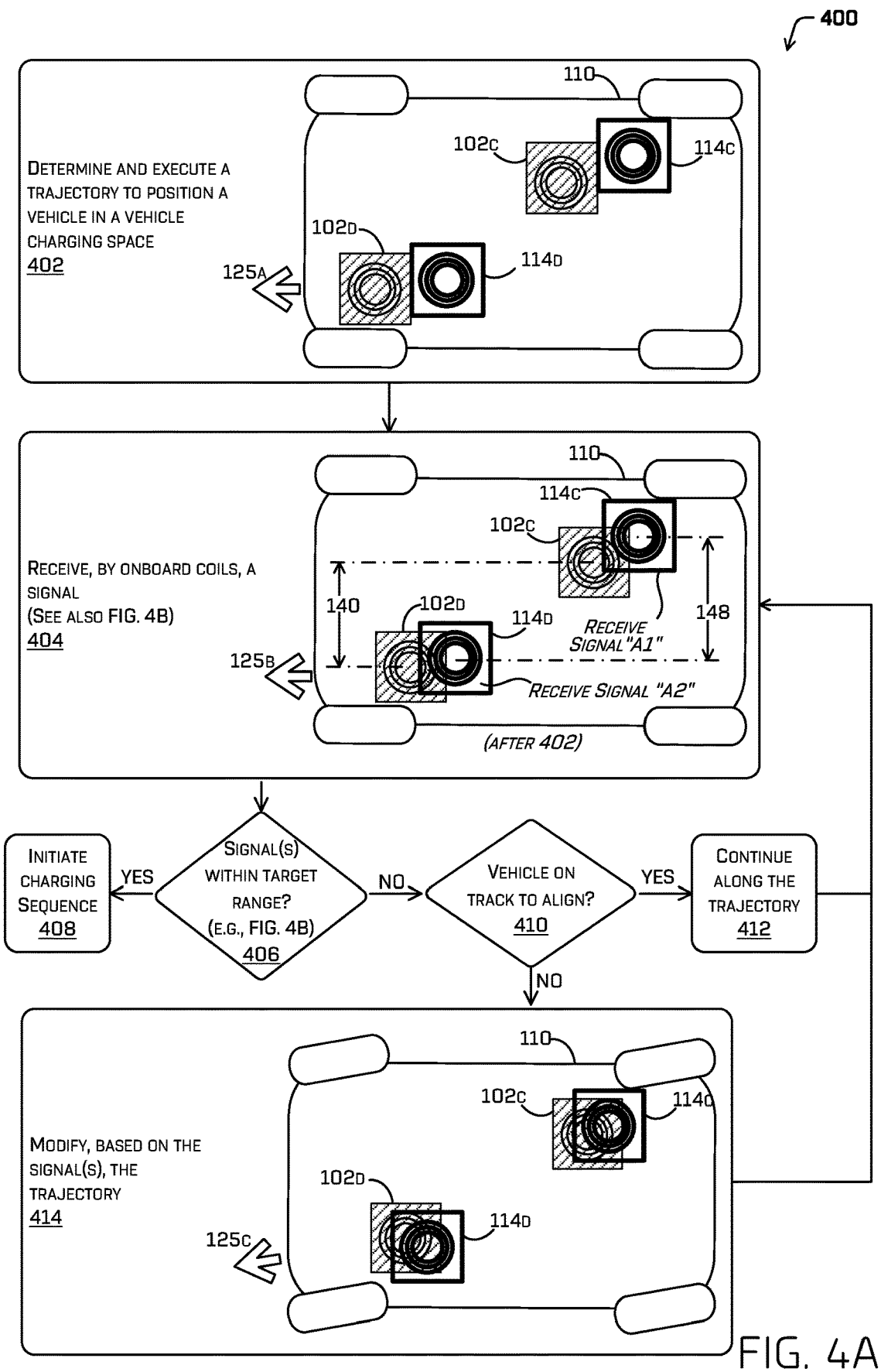
FIG. 4A is a flow diagram illustrating a process for charging a vehicle using multiple coils.

Referring now to FIG. 4A, FIG. 4A depicts a flowchart showing an example process involving techniques as described herein. The process illustrated in FIG. 4A may be described with reference to components and elements described above with reference to FIGS. 1A, 1B, 2, and 3A-3C for convenience and ease of understanding. In addition, some steps of the process 400 are illustrated by a respective pictorial and may also be described with respect to FIG. 4B. However, the process illustrated in FIG. 4A is not limited to being performed using these components, and the components are not limited to performing the process illustrated in FIG. 4A. The process illustrated in FIG. 4A is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the process.

FIG. 4A includes a flow diagram with operations or steps for a process 400 for charging a vehicle using multiple coils. At step 402, the process 400 may include determining and executing a trajectory to position a vehicle in a vehicle charging space. For example, the vehicle 110 may, using the planner 164, determine a trajectory (e.g., indicated by the arrow 125a) to position the vehicle 110 in a vehicle charging space, which is associated with the offboard coil 102c and the offboard coil 102d. As explained in other parts of this disclosure, in examples, upon entering (or being proximate to) the vehicle charging depot 100, the vehicle may (e.g., using the communication unit 128) send a communication 162 to the depot controller 120 (e.g., remote computing device or cloud-based service). Among other things, the communication 162 may include a request to access a vehicle charging space, a vehicle identifier, and information describing the charging system of the vehicle (e.g., capacities, coil spacing, etc.). In some instances, the depot controller 120 may be able to perform a lookup function (e.g., based on a vehicle identifier) to determine vehicle charging system details. Based on the charging system of the vehicle 110 or the vehicle identifier, the depot controller may determine a vehicle charging space that is available and is configured to (e.g., based on the lateral offset of the onboard and/or offboard coils) wirelessly charge the vehicle charging system and send the vehicle a communication 162 identifying the vehicle charging space (e.g., "2"). In addition, based on the information associated with the vehicle charging system (e.g., either provided by the vehicle 110 to the controller 120 or/and retrieved by the controller 120), the controller 120 may control (e.g., via a signal to the DC source and/or the relevant power electronics 104) the amount of power inductively transferrable from offboard coils (e.g., of the assigned vehicle charging space) to the vehicle 110. The communication 162 may include location information or other details that enable the vehicle 110 to determine a location of the assigned vehicle charging space. For example, the vehicle 110 may determine a location of the vehicle charging space 2 using a stored map 124 and may use a planner 164 to determine a trajectory to the vehicle charging space 2. In addition to the stored map, the planner 164 may use perception data (e.g., data representing the markings 166a-166c), and/or derivates from the stored map and/or perception data (e.g., determined longitudinal direction and midline of the vehicle charging space). In some examples, the planner 164 may use fiducial markers usable by one or more sensor modalities (e.g., camera, lidar, etc.) to help localize the vehicle with respect to the map 124. In some examples, once the vehicle 110 starts executing the trajectory, a power system of the vehicle 110 may perturbate an AC in each onboard coil 114c and 114d to assist with detecting signals (e.g., impedance, current, etc.) based on a presence of, or at least partial alignment with, the offboard coils 102c and 102d. In the pictorial associated with the step 402, the coils may not yet be close enough to create any field and/or generate any signal(s) detected by the onboard coils.

The process 400 includes, at step 404, by the one or more onboard charging coils, one or more signals (e.g., impedance or current that is based on the AC perturbated in each onboard coil 114c and 114d and that is generated from at least partial alignment with the offboard coils). For example, in FIG. 4A and in the pictorial associated with step 404, the vehicle 110 has maneuvered further in the direction indicated by the arrow 125b, such that, now, at least the second onboard coil 114d may detect a signal (e.g., signal "A2") created by a presence of, and partial alignment with, the second offboard coil 102d. A signal may also be detected at the first onboard coil 114c (e.g., "A1"), and in the pictorial, there is greater alignment (e.g., overlap) between the coils 102d and 114d. In some examples, the signal detected by the onboard coil 114c may be higher than the signal (if any) detected by the onboard coil 114d.

At step 406, the process 400 may include determining whether the signal(s) detected at step 404 are within a target range (e.g., threshold range). In some examples, the target range may be a range of signal values that indicate an amount of coil alignment that is likely to result in efficient inductive charging. For example, a target range may include a target range for the coil 114d and a separate target range for the coil 114c. In some examples, the target range may be a combined signal target range that is a range of a combination of the signal detected at the coil 114c and the signal detected at the coil 114d.

Figure 4B:
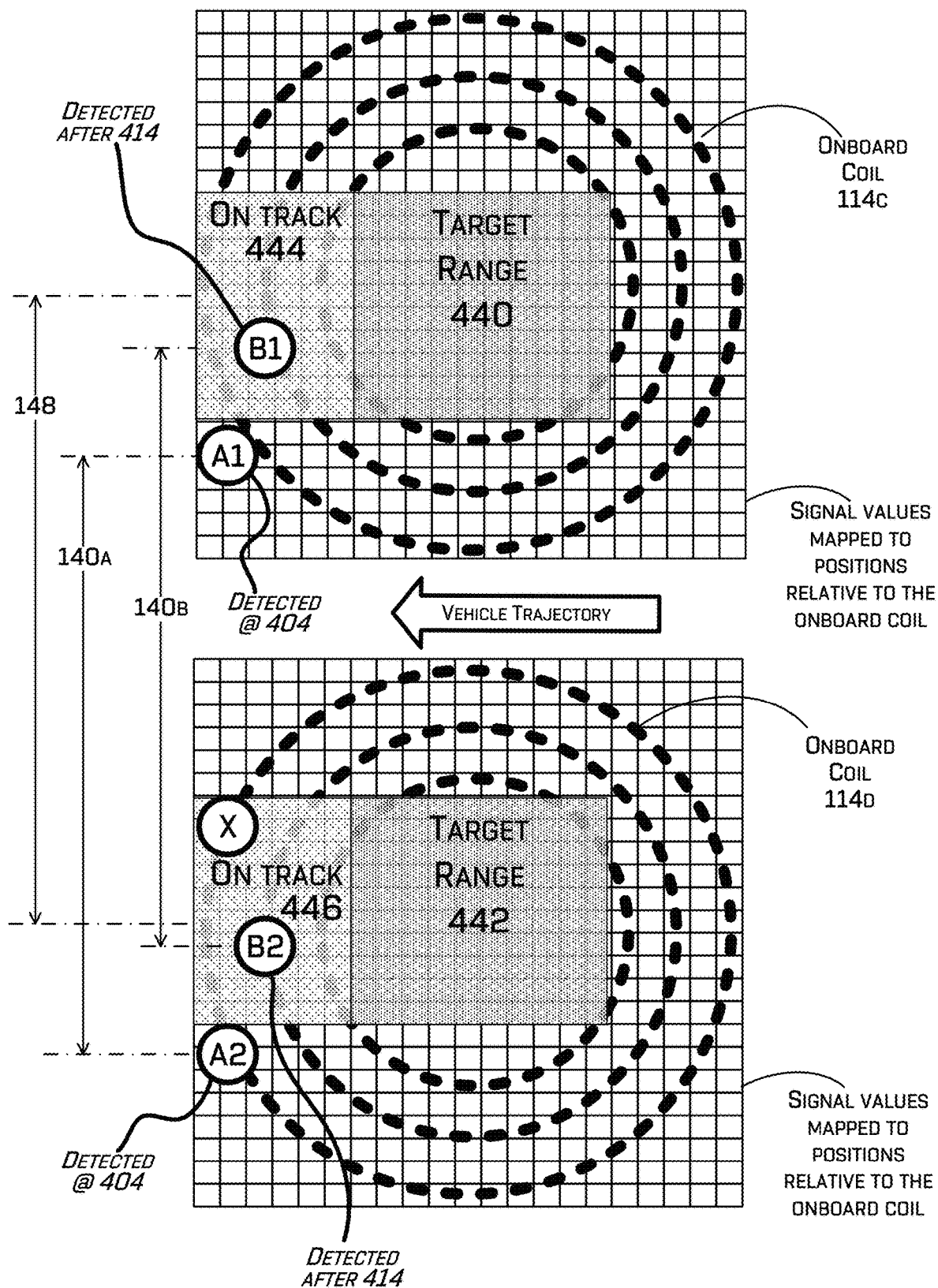
FIG. 4B is a pictorial of some steps depicted in the process of FIG. 4A.

In some examples, step 406 may include referencing signal values that have been mapped to positions relative to onboard coils. That is, the signal received or detected at 404 may depend on where an offboard coil is relative to the onboard coil, and as such, if a signal is detected, a position relative to the offboard coil may be determined. For example, referring to FIG. 4B, each of the onboard coil 114c and the onboard coil 114d is depicted, as well as estimated signal values mapped to each coil (as represented by the grid overlay). In examples, the estimated signal values may be based on one or more of a vehicle type, vehicle dimensions (e.g., z-distance between onboard and offboard coils), onboard and/or offboard coil specifications, and the like. For illustrative purposes, a longitudinal offset between the coils is not shown, but the lateral offset 148 is identified. In addition, each of the mappings is further labeled to identify positions that correspond with target range 440 and 442 signal values (e.g., signal values that indicate an amount of coil alignment that is likely to result in efficient inductive charging). In the example illustrated by FIG. 4B, a first detected signal "A1" and a second detected signal "A2" are identified, such as the signal(s) detected at step 404. As illustrated in FIG. 4B, the first and second detected signals A1 and A2 are not within the respective target ranges 440 and 442 (e.g., the signals A1 and A2 do not correlate with positions likely result in efficient inductive charging if the vehicle were to stop).

In some examples, inferences may be drawn regarding the relative positions of A1 and A2 (or other pairs of signal values), based on the onboard and offboard coil layouts. For example, with given similar longitudinal offsets (e.g., offboard offset 142 being similar to onboard offset 150) and given lateral offsets (e.g., offboard offset 140a and onboard offset 148) that are different from one another, a determination can be made that A2 is at the position indicated in FIG. 4B and not at the position "X." That is, even though alignment at the position X may provide a similar signal value as alignment at A2, the offset 140a would place A1 at different position than the position correlating with the detected signal. If the offsets 140a and 148 were the same distance, then it may be harder to determine relative positions. Furthermore, in some examples, the system may apply a default setting that maps the relative positions of A1 and A2 on the half of the coil oriented towards the direction the vehicle is maneuvering, when no prior signals were detected. In some examples, the detected values and the mapping may be used as triangulation values that correlate a first impedance value at the coil 114c and a second impedance value at the coil 114d with a position.

In some examples, vehicle position (or onboard coil position) relative to the charging space (or the offboard coil) may be determined based on signals received by one of the onboard coils After step 406 (FIG. 4A), if the signal values are within the target range (e.g., "YES" at step 406 indicating an amount of coil alignment that is likely to result in efficient inductive charging), then the process may proceed to step 408, which may include initiating a charging sequence. Among other things, step 408 may include stopping the vehicle, initiating a powering of the offboard coils 102c and 102d, transmitting information related to the vehicle 110 (e.g., vehicle identifier, owner, billing information, etc.) and the charging system of the vehicle 110 (e.g., charge state, capacities, etc.) to the charging depot and/or one or more components of the charging station (e.g., wireless coil, power converter, etc.).

If at step 406, the signal values are not within the threshold target range (e.g., "NO" at step 406), then the process 400 may proceed to step 410. At step 410, the process includes determining (e.g., predicting) whether the vehicle is on track to reach a target signal range (e.g., determine whether sufficient coil alignment is likely) based on the signal detected at step 404. For example, the mapping in FIG. 4B also identifies relative positions that are identified as "on track 444" and "on track 446." As such, the impedance values A1 and A2 detected at step 404 may be looked up to determine whether they map to "on track" values. In some examples, the "on track" labeling or designation may assume the trajectory (e.g., 125*b*) aligns with the longitudinal direction of the charging space. As such, it may be assumed that if detected signals at both coils are mapped to those zones, then the vehicle will proceed to align in the target zones.

If the vehicle is on track to align (e.g., "YES" at step 410), then the process proceeds to step 412, which may include continuing along the trajectory, and then returning to steps 404 and then 406 to iteratively detect one or more signals and determine whether the detected signals are within a target range. If the vehicle is not on track (e.g., "NO" at 410), then the process proceeds to step 414 to modify the trajectory. For example, referring back to FIG. 4B, A1 and A2 do not map to the "on track" zones, and as such, a decision may be determined that the vehicle 110 is not on track. This determination may be based on various factors. For example, the process 400 may assume that the trajectory 125*b* aligns with the longitudinal direction of the vehicle charging space.

At step 414, the process includes modifying, based on one or more of the signals, the trajectory. For example, in FIG. 4A and in the pictorial associated with step 414, the trajectory (e.g., indicated by arrow 125*c*) has been modified to traverse slightly to the left, such as by turning the wheels of the vehicle 110. FIG. 4A illustrates one example in which the vehicle 110 may include four-wheel steering that enables the vehicle to execute a "crab" maneuver. In other examples, the vehicle 110 may include only front steering, in which case the vehicle may modify the trajectory by turning the front wheels in a direction (e.g., in a direction towards the onboard coil detecting the higher impedance), traversing a distance while the wheels are turned, and then straitening the wheels back out to realign the trajectory with the longitudinal direction of the vehicle charging space. After modifying the trajectory at step 414, the process may return to step 404, 406, and 410 if necessary. For example, referring to FIG. 4B, after the modification at step 414, the impedances "B1" and "B2" may be detected. As can be seen by the illustration, the impedances "B1" and "B2" are not in the target range, and based on the mapping to the on-track zone, a determination can be made that the vehicle is on track to align.

In the process 400, the vehicle may stop as part of step 408 to initiate the charging sequence. In some examples, the vehicle may stop and/or initiate charging under other circumstances. For example, the vehicle may stop after a threshold number of iterations are completed. In addition, the vehicle may stop and/or initiate charging when a threshold change in signal value has been achieved from step 404. The vehicle may also stop and/or initiate a charging sequence based on some other sensor determining a position of the vehicle (e.g., lidar, camera, etc.) and/or signals exchanged between the vehicle (e.g., communications unit, onboard charging coils, etc.) and the offboard charging system (e.g., depot controller, offboard coil(s), power electronics, DC source, etc.). In some examples, the vehicle may stop and initiate charging when a parking curb, block, or other structure is contacted by the vehicle (e.g., by the vehicle wheels).

One or more of the steps of the process 400 may be informed by, or based on, various considerations. For example, because the coils are offset at different distances, a different signal value at one coil than the other coil may indicate the vehicle is misaligned or offset towards the side of the higher value impedance. Absent this offset difference (e.g., if the onboard coils and offboard coils were laterally spaced apart by the same amount), the signal values may be more likely to be the same at each coil and could be harder to detect misalignment and determine how to change a trajectory. As such, the first and second signal values detected at step 404 may be compared to the estimated signal values (e.g., mapped to the coil) to determine whether the trajectory should be modified to the left or to the right. In some examples, the first and second detected signal values may not be compared to estimated signal values, and instead, an adjustment may be made based on whether the signal is higher at one coil versus the other coil. In that example, steps 404 and 406 may be repeated, such as until a difference between the signal at the first onboard coil 114*c* and the signal at the second onboard coil 114*d* is lower than a threshold. In at least some examples, the estimated positions (e.g., based on the impedance mapping) may be used for triangulation and may be used to determine the vehicle trajectory.

As described above, in some examples, signals at multiple onboard coils may be used to determine or modify a trajectory of a vehicle. The signals may be compared to estimated signal values to estimate a location of the vehicle or the onboard coils relative to the offboard coils. In some examples, the signals may be determined across multiple samples (e.g., at different times) while the vehicle maneuvers to determine whether a value associated with the signal is getting closer to a target range, and the vehicle trajectory may be maintained or modified accordingly. In some examples, signals at one onboard coil may be used to determine or modify a vehicle trajectory, such as where a vehicle only has one coil or where signals associated with a coil are processed (e.g., analyzed) separately from signals associated with another coil. For example, signals associated with one coil may be iteratively determined and sampled over time as the vehicle maneuvers (and potentially changes trajectories) to determine whether a value of the signal is getting closer to a target range (in which case a trajectory is maintained) or farther from a target range (in which case a trajectory may be modified). In some examples, an algorithm (e.g., gradient descent/ascent) may consider the change in signal values as the vehicle moves to determine or modify the vehicle trajectory.

Figure 5:
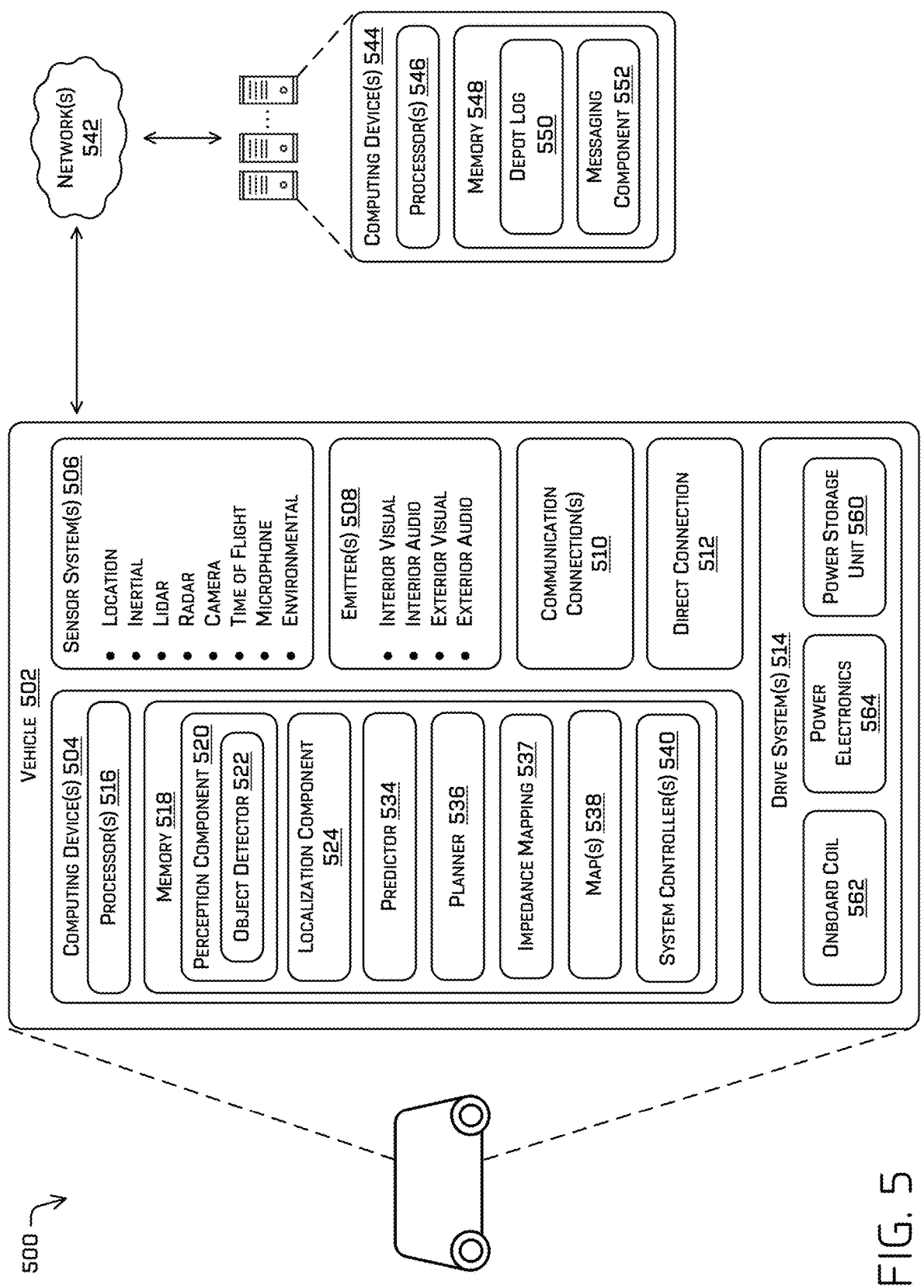
FIG. 5 is a block diagram illustrating an example system, including a vehicle, for performing some techniques as described herein.

FIG. 5 depicts a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle. The vehicle 502 may be any of the vehicles 108, 110, or 112 depicted in FIGS. 1A, 1B, 2, 3A-3C, 4A, and 4B and may be configured to recharge a battery (e.g., power storage unit 560) using multiple coils.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., charging coil, coil power electronics, wireless-charging adapter, DC fast charger, DC source, a remote teleoperation computing device, etc.) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external network(s) 542 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 5G, 5G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery (e.g., power storage unit 560), an onboard coil 562 or multiple onboard coils (e.g., induction coil) for wirelessly charging the high voltage battery, a motor to propel the vehicle, a power electronics unit 564 to bi-directionally convert between direct current and alternating current, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a perception component 520, a localization component 524, a predictor 534, a planner 536, maps 538, and one or more system controller(s) 540. Though depicted as residing in the memory 518 for illustrative purposes, it is contemplated that the perception component 520, the localization component 524, the predictor 534, the planner 536, the maps 538, and the one or more system controller(s) 540 can additionally, or alternatively, be accessible to the computing device 504 (e.g., stored in a different component of vehicle 502) and/or be accessible to the vehicle 502 (e.g., stored remotely).

The perception component 520 can include functionality to perform object detection, segmentation, and/or classification. In some examples, the perception component 520 and/or the object detector 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 520 can provide processed sensor data that indicates one or more characteristics associated with a detected entity and/or the environment in which the entity is positioned (e.g., markings 166a-166c). In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 520 can include functionality to store perception data generated by the perception component 520. In some instances, the perception component 520 can determine a track corresponding to an object that has been classified as an object type. For purposes of illustration only, the perception component 520, using sensor system(s) 506 can capture one or more images of an environment, which may be used to determine information about an environment.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 522 can detect (among other things) semantic objects represented by sensor data. In some examples, the object detector 522 can identify such semantic objects and can determine a two-dimensional or a three-dimensional bounding box associated with the object. The object detector 522 can determine additional information such as a location, orientation, pose, and/or size (e.g., length, width, height, etc.) associated with the object. The object detector 522 can send data to other components of the system 500 for localization and/or determining calibration information, as discussed herein.

The localization component 524 can include functionality to receive data from the sensor system(s) 506 and/or other components to determine a position of the vehicle 502. For example, the localization component 524 can include and/or request/receive a three-dimensional map of an environment and can continuously determine a location of the autonomous vehicle within the map (e.g., determining a location in or near a charging depot). In some instances, the localization component 524 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 524 can provide data to various components of the vehicle 502 to determine an initial position of an autonomous vehicle for generating a trajectory (e.g., to a vehicle charging space) or for initial calibration.

The predictor 534 can generate one or more probability maps representing prediction probabilities of possible locations of one or more objects in an environment. For example, the predictor 534 can generate one or more probability maps for vehicles, pedestrians, animals, and the like within a threshold distance from the vehicle 502. In some instances, the predictor 534 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planner 536 can determine a path for the vehicle 502 to follow to traverse through an environment (e.g., through a charging depot to an assigned vehicle charging space). For example, the planner 536 can determine various routes and paths and various levels of detail. In some instances, the planner 536 can determine a route to travel from a first location (e.g., a current location) to a second location (e.g., a target location, such as a vehicle charging space). For the purpose of this discussion, a route can be a sequence of waypoints for traveling between two locations. As non-limiting examples, waypoints include streets, intersections, global positioning system (GPS) coordinates, etc. Further, the planner 536 can generate an instruction for guiding the autonomous vehicle along at least a portion of the route from the first location to the second location. In at least one example, the planner 536 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique.

A single path of the multiple paths in a receding data horizon having the highest confidence level may be selected to operate the vehicle.

In other examples, the planner 536 can alternatively, or additionally, use data from the perception component 520 (e.g., sensor data based on markings 166a-166c) and/or the predictor 534 to determine a path for the vehicle 502 to follow to traverse through an environment. For example, the planner 536 can receive data from the perception component 520 and/or the predictor 534 regarding objects associated with an environment. Using this data, the planner 536 can determine a route to travel from a first location (e.g., a current location) to a second location (e.g., a target location) to avoid objects in an environment. In at least some examples, such a planner 536 may determine there is no such collision free path and, in turn, provide a path which brings vehicle 502 to a safe stop avoiding all collisions and/or otherwise mitigating damage.

In some examples, the memory 518 can store at least one impedance mapping 537 (e.g., FIG. 4B). For example, the impedance mapping 537 may map impedance values, which may be detected from impedance created from offboard coils, to relative positions on the onboard coils or other portions of the vehicle. In examples, the planner 536 may use the impedance mapping (or information derived from the impedance mapping to determine a trajectory).

The memory 518 can further include one or more maps 538 (e.g., depot map 124) that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 538 can include at least one map (e.g., images and/or a mesh). In some examples, the vehicle 502 can be controlled based at least in part on the map(s) 538. That is, the map(s) 538 can be used in connection with the perception component 520 (and sub-components), the localization component 524 (and sub-components), the predictor 534, and/or the planner 536 to determine a location of the vehicle 502, identify objects in an environment, generate prediction probabilit(ies) associated with objects and/or the vehicle 502, and/or generate routes and/or trajectories to navigate within an environment (e.g., a trajectory to navigate within a charging-depot environment to maneuver into a vehicle charging space).

In at least one example, the computing device 504 can include one or more system controller(s) 540, which can be configured to control steering, propulsion, braking, safety, emitters, communication, and other systems of the vehicle 502. These system controller(s) 540 can communicate with and/or control corresponding systems of the drive system(s) 514 and/or other components of the vehicle 502, which may be configured to operate in accordance with a path provided from the planner 536.

The vehicle 502 can connect to computing device(s) 545 via network 542, and the computing device(s) 545 can include one or more processor(s) 546 and memory 548 communicatively coupled with the one or more processor(s) 546. In at least one instance, the one or more processor(s) 546 can be similar to the processor(s) 516 and the memory 548 can be similar to the memory 518. In at least one example, the computing device(s) 545 may include a depot controller (e.g., 120). In the illustrated example, the memory 548 of the computing device(s) 545 stores a depot log 550 and/or a messaging component 552. In at least one instance, the depot log 550 may perform operations for tracking usage and availability of vehicle charging spaces in the charging depot. For example, the depot log 550 may track which vehicle charging spaces are currently in use and which are available. In addition, the depot log 550 may be used to determine billing operations related to how charging services provided by a charging depot should be billed. Furthermore, the depot log may store information related to each vehicle charging space, which may be referenced to match an incoming request to an appropriately configured vehicle charging space (e.g., based on coil offsets of the vehicle and the charging space). In at least some other examples, the messaging component 552 may perform operations for transmitting messages to and/or receiving messages from vehicles or charging depot components (e.g., offboard coils, power electronics, adapters, DC source, etc.).

The processor(s) 516 of the computing device 504 and the processor(s) 546 of the computing device(s) 545 can be any suitable processor capable of executing instructions to process data and perform operations as described herein. By way of example and not limitation, the processor(s) 516 and 546 can comprise one or more Central Processing Units (CPUs), Graphics Processing Units (GPUS), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 computing device 504 and the memory 548 of the computing device(s) 545 are examples of non-transitory computer-readable media. The memory 518 and 548 can store an operating system and one or more software applications, instructions, programs, and/or data to implement the methods described herein and the functions attributed to the various systems. In various implementations, the memory 518 and 548 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 518 and 548 can be implemented as a neural network. In some examples a machine learned model could be trained for object detection (e.g., a vehicle detecting objects or components of the charging depot) or trajectory planning for parking in position to align coils.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

As described above with reference to FIGS. 1-5, techniques described herein can be useful for recharging a battery of an electric vehicle. In some instances, wireless charging may be more convenient than conventional physical-contact charging systems and may reduce maintenance associated with wear of the physical contacts. In addition, wirelessly charging may be performed using a plurality of charging coils. The offboard coils and the onboard coils may be spaced apart (e.g., laterally offset) by different amounts, such that, when the vehicle is positioned in the vehicle charging space, at least one pair of an onboard coil and an offboard coil may still be substantially aligned for wireless charging, even when other coils are misaligned (e.g., the vehicle is not centered in the vehicle charging space). In additional examples, the offboard coils may include size blocks (e.g., 50 kW) that are conducive to charge smaller capacity systems in some arrangements and are combinable (e.g., in a vehicle charging space) to charge larger capacity systems in other arrangements. In this respect, the coils may provide building blocks to create multiple vehicle charging spaces arranged in a charging depot, which may be configured to charge various vehicles (e.g., a fleet of vehicles) having various-sized power systems. In addition, the use of relatively small coils may allow for more passive thermal management solutions (e.g., air cooled), even when multiple coils are used in combination to charge a single vehicle.

Example Clauses

Clause A: A vehicle comprising: a first onboard charging coil configured to inductively receive a first alternating current (AC); a second onboard charging coil configured to inductively receive a second AC, the second onboard charging coil being offset from the first onboard charging coil in both a lateral axis of the vehicle and a longitudinal axis of the vehicle; a power electronics unit coupled to the first onboard charging coil and the second onboard charging coil and configured to convert the first AC and the second AC to a direct current (DC); a power storage unit coupled to the power electronics unit and configured to store the DC; one or more processors; and one or more non-transitory computer-readable media storing instructions executable by the one or more processors, wherein the instructions, when executed, cause the one or more processors to perform operations comprising: determining a trajectory of the vehicle; detecting, by the first onboard charging coil, a first signal; detecting, by the second onboard charging coil, a second signal; and modifying, at least partially based on one or more of the first signal or the second signal, the trajectory.

Clause B: The vehicle of clause A, wherein the first onboard charging coil and the second onboard charging coil are configured to inductively receive a first quantity of power in parallel, and wherein the power storage unit is configured to receive a second quantity of power that is at least twice the first quantity.

Clause C: The vehicle of clause A or B, wherein the modifying includes turning at least one vehicle wheel in a direction and traversing forward with the at least one vehicle wheel turned in the direction.

Clause D: The vehicle of any of clauses A-C, wherein the operations further comprise, after modifying the trajectory: detecting, by the first onboard charging coil, a third signal; detecting, by the second onboard charging coil, a fourth signal; determining that one or more of the third signal or the fourth signal is within a threshold range; and initiating a charging sequence to inductively charge the vehicle using one or more of the first onboard charging coil or the second onboard charging coil.

Clause E: The vehicle of any of clauses A-D, wherein the first onboard charging coil is configured to inductively receive the first AC from a first offboard charging coil simultaneously with the second onboard charging coil inductively receiving the second AC from a second offboard charging coil; and wherein the first and second onboard charging coils are offset in the lateral axis by a by a first distance, which is larger than a second distance by which the first and second offboard charging coils are offset.

Clause F: A vehicle comprising: a power storage unit; a power electronics unit coupled to the power storage unit and configured to convert alternating current (AC) to direct current (DC) and to transmit the DC to the power storage unit for power storage; a first onboard charging coil; and a second onboard charging coil, wherein the first onboard charging coil and the second onboard charging coil are spaced apart by a distance in the lateral axis of the vehicle.

Clause G: The vehicle of clause F, wherein the first onboard charging coil and the second onboard charging coil are configured to inductively receive a same quantity of power in parallel.

Clause H: The vehicle of clause F or G, wherein the vehicle further comprises: one or more processors; and one or more non-transitory computer-readable media storing instructions executable by the one or more processors, wherein the instructions, when executed, cause the one or more processors to perform operations comprising: determining a first signal associated with the first onboard charging coil; determining a second signal associated with the second onboard charging coil; determining, at least partially based on one or more of the first signal or the second signal, a trajectory of the vehicle; and controlling the vehicle in accordance with the trajectory.

Clause I: The vehicle of clause H, wherein the determining the trajectory includes determining, as a pose, one or more of a position or orientation for the vehicle to move to, which one or more of changes the first signal to include a threshold range or changes the second signal to include the threshold range.

Clause J: The vehicle of clause H or I, wherein the operations further comprise: detecting, by the first onboard charging coil, a third signal; detecting, by the second onboard charging coil, a fourth signal; determining that one or more of the third signal or the fourth signal is within a threshold range; and initiating a charging sequence to inductively charge the vehicle using one or more of the first onboard charging coil or the second onboard charging coil.

Clause K: The vehicle of any of clauses H-J, wherein the determining the trajectory is further based on sensor data received from one or more sensors associated with the vehicle.

Clause L: The vehicle of any of clauses F-K, wherein the vehicle further comprises: one or more processors; and one or more non-transitory computer-readable media storing instructions executable by the one or more processors, wherein the instructions, when executed, cause the one or more processors to perform operations comprising: sending, to a charging-site controller, a first signal requesting identification of a vehicle charging space, the first signal indicting the distance in the lateral axis of the vehicle; receiving a second signal identifying the vehicle charging space; determining, based on a location of the vehicle charging space, a trajectory; and controlling, based on the trajectory, the vehicle.

Clause M: The vehicle of any of clauses F-L, wherein the vehicle is configured to charge the power storage unit using a first offboard coil and a second offboard coil that are spaced apart by a second distance in a first direction; and wherein the distance is greater than the second distance.

Clause N: The vehicle of clause M, wherein: the first and second onboard charging coils are spaced apart from one another by a third distance in a longitudinal axis of the vehicle; and the first and second offboard charging coils are spaced apart from one another by a fourth distance in a second direction perpendicular to the first direction, the third and fourth distances being substantially the same.

Clause O: A method comprising: determining, based at least partially on a location of a first offboard charging coil and a second offboard charging coil, a trajectory of a vehicle, the vehicle comprising a first onboard charging coil and a second onboard charging coil; at least partially aligning, by the vehicle and based on the trajectory, one or more of the first onboard charging coil with the first offboard charging coil or the second onboard charging coil with the second offboard charging coil; and inductively charging, by one or more of the first onboard charging coil being at least partially aligned with the first offboard charging coil or the second onboard charging coil being at least partially aligned with the second offboard charging coil, a power storage unit of the vehicle.

Clause P: The method of clause O further comprising, receiving one or more of a first signal via the first onboard charging coil or a second signal via the second onboard charging coil; and modifying, based on one or more of the first signal or the second signal, the trajectory.

Clause Q: The method of clause P, wherein modifying the trajectory includes turning at least one vehicle wheel in a direction while traversing forward with the at least one vehicle wheel turned in the direction.

Clause R: The method of any of clauses O-Q further comprising, receiving sensor data from a perception sensor associated with the vehicle; and determining, based at least partially on the sensor data, the trajectory.

Clause S: The method of any of clauses O-R further comprising, prior to determining the trajectory: sending, to a charging-site controller, a first signal requesting identification of a vehicle charging space, the signal indicting a distance by which the first onboard charging coil and the second onboard charging coil are offset in the lateral axis of the vehicle; receiving a second signal identifying the vehicle charging space; and determining, based on the vehicle charging space, the location.

Clause T: The method of clause S, wherein the signal indicating the distance includes one or more of a vehicle identifier, a vehicle type, or the distance.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
    a first onboard charging coil configured to inductively receive a first alternating current (AC);
    a second onboard charging coil configured to inductively receive a second AC, the second onboard charging coil being offset from the first onboard charging coil in both a lateral axis of the vehicle and a longitudinal axis of the vehicle;
    a power electronics unit coupled to the first onboard charging coil and the second onboard charging coil and configured to convert the first AC and the second AC to a direct current (DC);
    a power storage unit coupled to the power electronics unit and configured to store the DC;
    one or more processors; and
    one or more non-transitory computer-readable media storing instructions executable by the one or more processors, wherein the instructions, when executed, cause the one or more processors to perform operations comprising:
        determining a trajectory of the vehicle;
        detecting, by the first onboard charging coil, a first signal;
        detecting, by the second onboard charging coil, a second signal; and
        modifying, at least partially based the first signal and the second signal, the trajectory.

2. The vehicle of claim 1, wherein the first onboard charging coil and the second onboard charging coil are configured to inductively receive a first quantity of power in parallel, and wherein the power storage unit is configured to receive a second quantity of power that is at least twice the first quantity.

3. The vehicle of claim 1, wherein the modifying includes turning at least one vehicle wheel in a direction and traversing forward with at least one vehicle wheel turned in the direction.

4. The vehicle of claim 1, wherein the operations further comprise, after modifying the trajectory:
    detecting, by the first onboard charging coil, a third signal;
    detecting, by the second onboard charging coil, a fourth signal;
    determining that one or more of the third signal or the fourth signal is within a threshold range; and
    initiating a charging sequence to inductively charge the vehicle using one or more of the first onboard charging coil or the second onboard charging coil.

5. The vehicle of claim 1,
    wherein the first onboard charging coil is configured to inductively receive the first AC from a first offboard charging coil simultaneously with the second onboard charging coil inductively receiving the second AC from a second offboard charging coil; and
    wherein the first and second onboard charging coils are offset in the lateral axis by a first distance, which is larger than a second distance by which the first and second offboard charging coils are offset.

6. A vehicle comprising:
    a power storage unit;
    a power electronics unit coupled to the power storage unit and configured to convert alternating current (AC) to direct current (DC) and to transmit the DC to the power storage unit for power storage;
    a first onboard charging coil;
    a second onboard charging coil;
    one or more processors; and
    one or more non-transitory computer-readable media storing instructions executable by the one or more processors, wherein the instructions, when executed, cause the one or more processors to perform operations comprising:
        determining a first signal associated with the first onboard charging coil;
        determining a second signal associated with the second onboard charging coil;
        determining, at least partially based on the first signal and the second signal, a trajectory of the vehicle; and
        controlling the vehicle in accordance with the trajectory,
    wherein the first onboard charging coil and the second onboard charging coil are spaced apart by a distance in a direction parallel to a lateral axis of the vehicle.

7. The vehicle of claim 6, wherein the first onboard charging coil and the second onboard charging coil are configured to inductively receive a same quantity of power in parallel.

8. The vehicle of claim 6, wherein determining the trajectory includes determining, as a pose, one or more of a position or orientation for the vehicle to move to, which one or more of changes the first signal to include a threshold range or changes the second signal to include the threshold range.

9. The vehicle of claim 6, wherein the operations further comprise:
    detecting, by the first onboard charging coil, a third signal;
    detecting, by the second onboard charging coil, a fourth signal;
    determining that one or more of the third signal or the fourth signal is within a threshold range; and
    initiating a charging sequence to inductively charge the vehicle using one or more of the first onboard charging coil or the second onboard charging coil.

10. The vehicle of claim 6, wherein the determining the trajectory is further based on sensor data received from one or more sensors associated with the vehicle.

11. The vehicle of claim 6, wherein the operations further comprise:
    sending, to a charging-site controller, a first signal requesting identification of a vehicle charging space, the first signal indicting the distance in the lateral axis of the vehicle;
    receiving a second signal identifying the vehicle charging space;
    determining, based on a location of the vehicle charging space, a modified trajectory; and
    controlling, based on the modified trajectory, the vehicle.

12. The vehicle of claim 6, wherein the vehicle is configured to charge the power storage unit using a first offboard coil and a second offboard coil that are spaced apart by a second distance in a first direction; and wherein the distance is greater than the second distance.

13. The vehicle of claim 12, wherein:
    the first and second onboard charging coils are spaced apart from one another by a third distance in a longitudinal axis of the vehicle; and the first and second offboard charging coils are spaced apart from one another by a fourth distance in a second direction perpendicular to the first direction, the third and fourth distances being substantially same.

14. The vehicle of claim 6, wherein the first onboard charging coil and the second onboard charging coil are spaced apart by the distance in the direction parallel to the lateral axis and by a second distance parallel to a longitudinal axis of the vehicle.

15. A method comprising: determining, based at least partially on a location of a first offboard charging coil and a second offboard charging coil, a trajectory of a vehicle, the vehicle comprising a first onboard charging coil and a second onboard charging coil;
 at least partially aligning, by the vehicle and based on the trajectory, the first onboard charging coil with the first offboard charging coil and second onboard charging coil with the second offboard charging coil;
 inductively charging, by one or more of the first onboard charging coil being at least partially aligned with the first offboard charging coil or the second onboard charging coil being at least partially aligned with the second offboard charging coil, a power storage unit of the vehicle;
 receiving a first signal via the first onboard charging coil and a second signal via the second onboard charging coil, and
 modifying, based on the first signal and the second signal, the trajectory.

16. The method of claim 15, wherein modifying the trajectory includes turning at least one vehicle wheel in a direction while traversing forward with the at least one vehicle wheel turned in the direction.

17. The method of claim 15 further comprising,
 receiving sensor data from a perception sensor associated with the vehicle; and
 determining, based at least partially on the sensor data, the trajectory.

18. The method of claim 15 further comprising, prior to determining the trajectory:
 sending, to a charging-site controller, a first signal requesting identification of a vehicle charging space, the signal indicting a distance by which the first onboard charging coil and the second onboard charging coil are offset in a direction parallel to a lateral axis of the vehicle;
 receiving a second signal identifying the vehicle charging space; and
 determining, based on the vehicle charging space, the location.

19. The method of claim 18, wherein the signal indicating the distance includes one or more of a vehicle identifier, a vehicle type, or the distance.

* * * * *